UNITED STATES PATENT OFFICE.

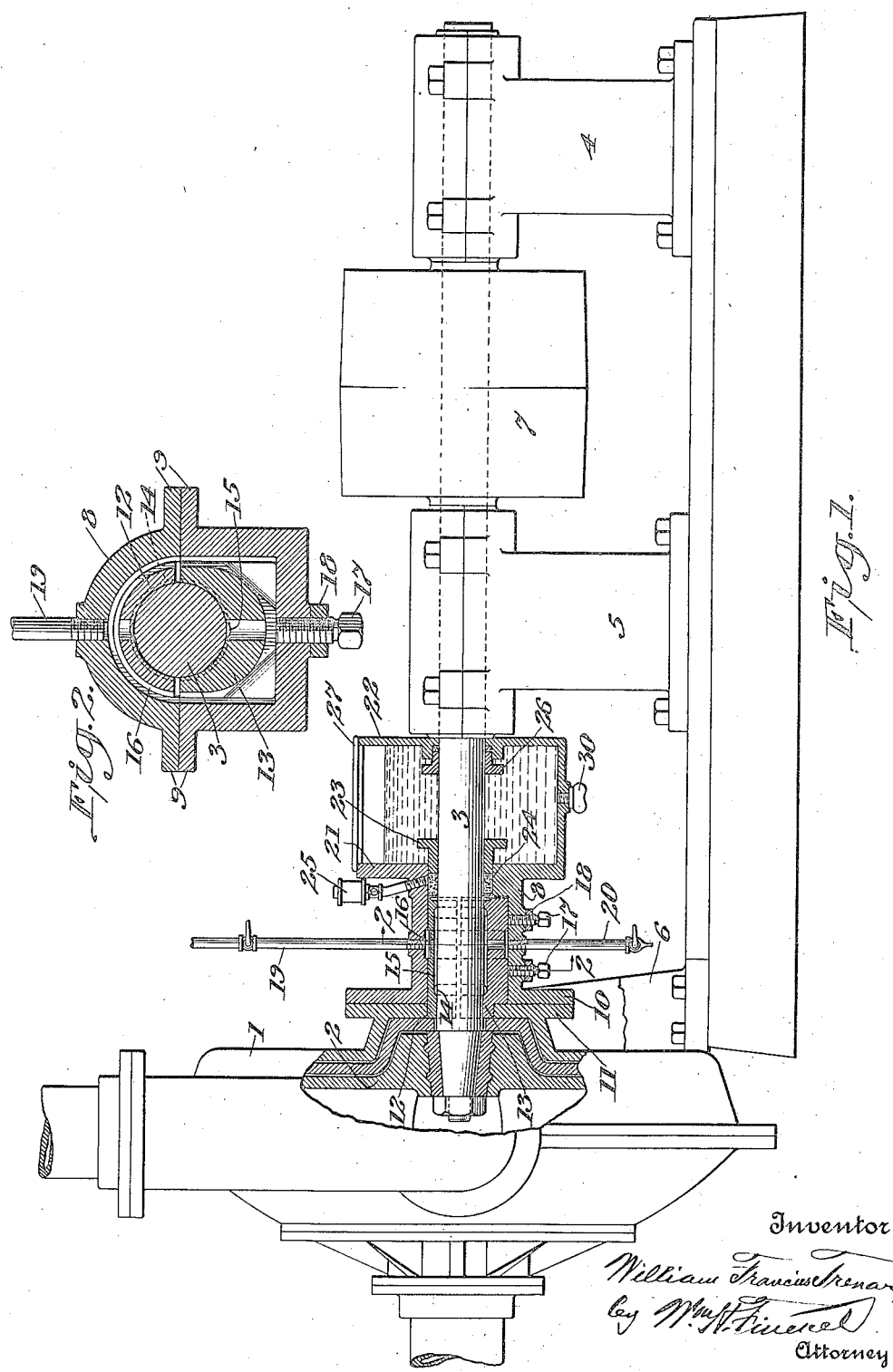

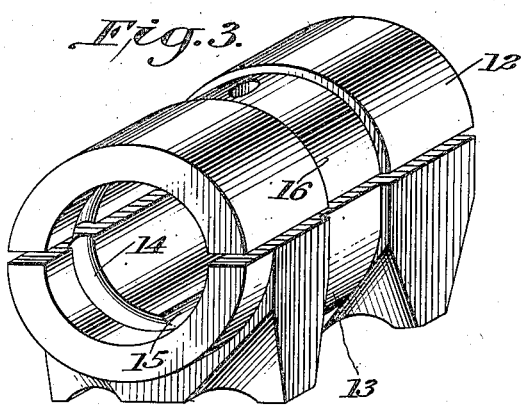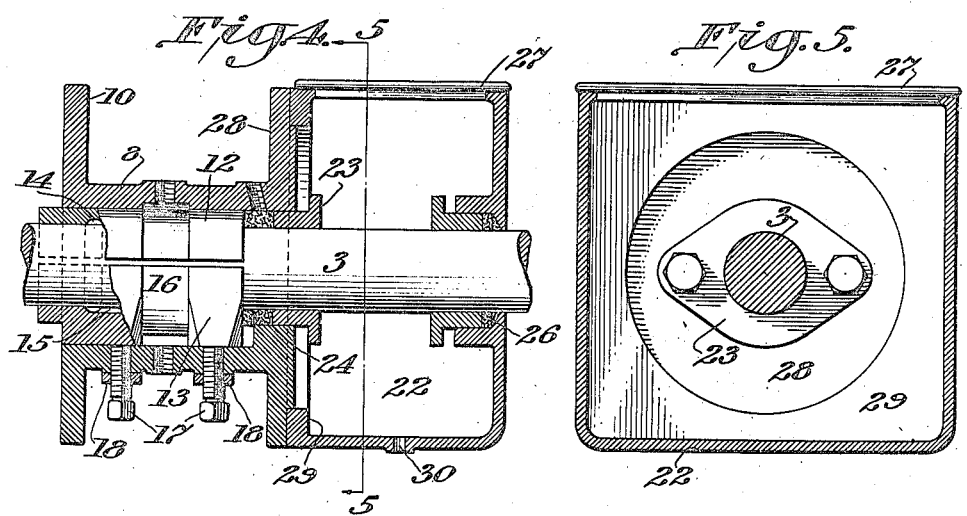

WILLIAM FRANCIES TRENARY, OF ATLANTA, GEORGIA.

CENTRIFUGAL PUMP.

1,423,369. Specification of Letters Patent. Patented July 18, 1922.

Application filed December 30, 1918. Serial No. 268,816.

*To all whom it may concern:*

Be it known that I, WILLIAM FRANCIES TRENARY, a citizen of the United States, residing at Atlanta, in the county of Fulton and State of Georgia, have invented a certain new and useful Improvement in Centrifugal Pumps, of which the following is a full, clear, and exact description.

This invention is in the nature of an improvement on the centrifugal pump of my Patent No. 984,456, granted February 14, 1911, the pump being primarily designed to supply liquid charged with solids, such as water charged with sand, or grit, for use in connection with gang saws, rubbing beds or the like in stone working machinery, and for other purposes; the apparatus, especially in the larger sizes, being adapted for efficient use as a dredge pump.

The object of the invention is to protect the piston shaft against undue abrasion and wear, and to prevent leakage on the suction side of the pump such as would cause the pump to lose its priming.

The invention consists of a stuffing box provided with a bushing that may be flushed, and that may be adjusted to the shaft to compensate for wear, and a liquid seal arranged next to the stuffing box and adapted to prevent leakage at that point and thereby insure the retention of the priming after the pump is once primed, as I will proceed now to explain and finally claim.

In the accompanying drawings illustrating the invention, in the several figures of which like parts are similarly designated, Figure 1 is an elevation partly in section, showing my improvements applied to a centrifugal pump of the type represented in my patent mentioned. Fig. 2 is a cross-section on a larger scale of the stuffing box taken on line 2—2 of Fig. 1. Fig. 3 is a perspective view of the bearing blocks or bushings used in the stuffing box. Fig. 4 is a longitudinal section illustrating a modification of the liquid seal. Fig. 5 is a cross-section of the liquid seal taken on line 5—5 of Fig. 4.

The pump casing 1, piston 2, shaft 3, bearings 4, 5 and 6, and the pulleys 7 may be substantially as in the patent referred to, or of any other approved character.

The stuffing box 8 may be divided and its parts provided with lateral flanges 9 suitably bolted together, and with end flanges 10 which may be bolted to the flange 11 of the pump casing. The stuffing box is chambered so as to receive the bearing blocks or bushings 12 and 13, and these bushings are bored to fit the shaft 3. As in the patent, so here, the bushings are provided with interior circumferential grooves 14 connected by longitudinal grooves 15; and in addition the bushing-parts are provided with external circumferential or peripheral grooves 16 which form in conjunction with the stuffing box a chamber which is in communication with the after-mentioned water-supply pipe and drain pipe. The object of this chamber is to receive water for cooling and lubricating the parts, and aid in washing out the dirt, grit, sand and other foreign matter that may have entered or may have been forced back into the bushing around the shaft.

The bottom of the stuffing box is provided with a number of set-screws 17 by means of which the bushing sections may be adjusted to compensate for wear, and in order to fix the adjustment of these screws, they may be provided with lock-nuts 18.

19 is the water-supply pipe above referred to opening into the stuffing box and communicating with the interior of the bushing and the chamber formed by the grooves 16 aforesaid, for introducing perfectly clean, clear water for cooling, lubricating and other purposes. In order to remove dirt, grit, and other matter getting into the bushing from the interior of the pump or otherwise, the drain-pipe 20 above referred to is introduced which is in open communication with the interior of the bushing and said chamber.

The rear end of the stuffing box is made with a flange 21 which forms a part of a tank 22 adapted to receive water or other sealing agent, so as to seal or render leak-proof the gland 23 inserted about the shaft 3 into the stuffing box. Any suitable packing 24 is introduced into the stuffing box between this gland and the shaft, and this packing is kept well oiled by means of any suitable oiling device 25, here shown as a compression cup. The opposite wall of the tank also is provided with a gland 26. The top of the tank may be left open and provided with any suitable removable cover 27. The function of the tank is, as already stated, to seal the outer end of the stuffing box. Should air enter at this point, the pump would lose its vacuum, or would "break" and thus render necessary a frequent re-priming of the pump. The liquid tank makes a perfect seal and prevents air from passing in at this point.

Preferably the seal is cast with the stuffing box, but it may be made separate and attached to the stuffing box by bolts, as indicated in Fig. 4, wherein the end of the stuffing box is made with a flange 28, and the tank is made with a flanged open end 29 fitted to this flange 28 in any suitable liquid-tight manner.

The bottom of the tank is provided with a suitable draining device 30, so as to drain off water to prevent freezing and also to evacuate sediment.

As illustrated, the parts are readily separable for renewals or repairs.

Variations in details of construction and arrangement of parts are permissible within the spirit and scope of the invention as herein claimed.

What I claim is:—

1. A shaft bearing, having a stuffing box, a divided bushing adapted to embrace the shaft, means to adjust the divided bushing to the shaft to compensate for wear on the shaft, means to supply liquid to the shaft within the bushing, and external circumferential grooves on the bushing members in communication with the liquid supply means to drain the liquid and solid matter from the bushing.

2. In a centrifugal pump, the combination of a stuffing box, bushings arranged therein and embracing a shaft, means for supplying liquid to the stuffing box, means to drain off the liquid from the stuffing box, and circumferential grooves in the bushings forming with the stuffing box a chamber which is in open communication with the liquid supply to thereby cool and lubricate the parts and to remove sand, grit or other foreign substance which might get in the bearing, a gland closing the outer end of the stuffing box, and a liquid seal applied to the outside of the stuffing box and the surrounding gland and enclosing said gland, said liquid seal consisting of a tank arranged transversely on the shaft and containing a liquid and adapted to render the stuffing box air-tight and thereby maintain the priming of the pump.

In testimony whereof I have hereunto set my hand this 24th day of December, A. D. 1918.

WILLIAM FRANCIES TRENARY.

Witnesses:
   J. T. HALE,
   OWENS JOHNSON.